Dec. 4, 1928.
C. F. DOANE
1,693,694
METHOD OF WRAPPING CHEESE
Filed June 10, 1927
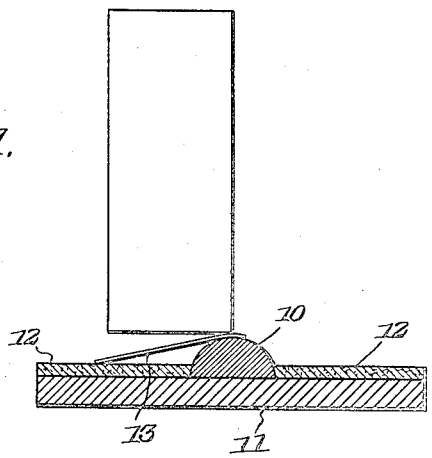
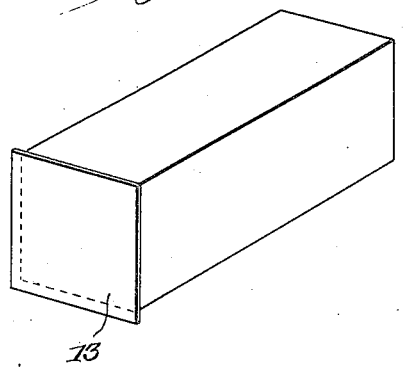
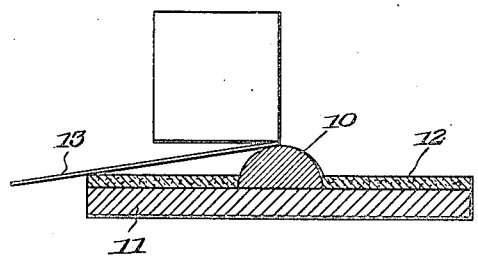
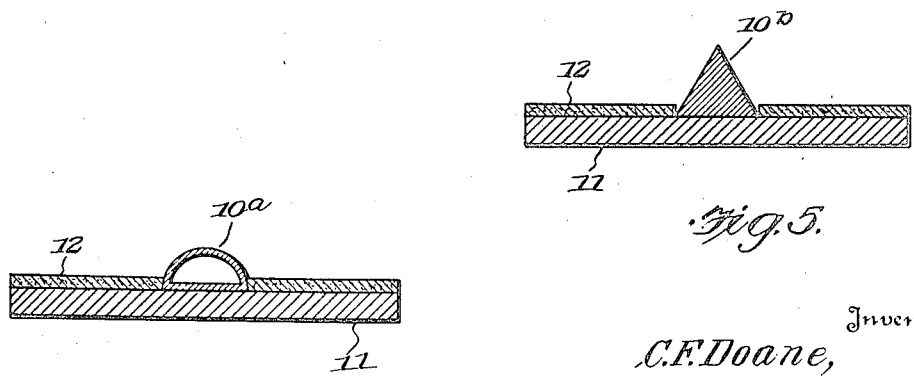
Inventor
C. F. Doane,
By Church & Church
Attorney Patented Dec. 4, 1928.

1,693,694

UNITED STATES PATENT OFFICE.

CHARLES F. DOANE, OF SALEM, OREGON.

METHOD OF WRAPPING CHEESE.

Application filed June 10, 1927. Serial No. 197,823.

At the present time there seems to be no successful method of packaging or wrapping cheese in a small individual package so that it will remain free from mold for a length of time sufficient to prevent practical handling of it in the retail trade.

In view of present day practices of handling a large proportion of food products and especially those which are not cooked before eating, the present method of marketing cheese would appear to be very much out of date as well as unsanitary, and uneconomical. It is deemed unsanitary because the cheese has every opportunity to become contaminated and even filthy in the many handlings which it receives, and it is thought to be economical because of the heavy total losses caused not only by the formation of rind which is unedible, but also by the drying of the cheese while in the hands of both the retailer and the consumer, thereby rendering large quantities most unappetizing. Attempts have been made to develop a practical package of cheese in comparatively small pieces weighing from one-fourth to one-half pound wrapped so as to prevent the formation of rind; the growth of mold on the surfaces; and losses by evaporation. It is believed, however, that such attempts have met with more or less failure and have been abandoned because of the inability to wrap such a package to entirely and consistently exclude the presence of air and, thereby, the consequent growth of mold. One of such prior attempts has resulted in a package which has been developed and extensively used but in its use the cheese is first melted and then treated with certain salts which very materially modify both the texture and the flavor of the original product. Very few, if any, of the manufacturers and consumers of this product claim that it possesses a quality equal to the original cheese even though cheese of high quality is originally used for the product. Its use, however, has developed very extensively in spite of the lack of quality and flavor, but this merely emphasizes the demand of the consuming public for cheese in comparatively small packages.

The failure of those who have so attempted to develop a small package of cheese which will not become contaminated with rind or mold has been due to the fact that the methods so far employed have not been such as will completely and entirely exclude air from the package and, as a consequence, both mold and rind have always developed on the surfaces of the wrapped cheese. Pockets or spaces for air may occur in any part of the packaged cheese immediately between the wrapper and the surface of the cheese but they are most likely to occur on the ends of the cheese where the wrapping material is folded in the final steps of the packaging process. In large packages, such as five pound loaves, the presence of a small amount of mold on the ends of the wrapped cheese may be serious, but it is not fatal, because the contaminated portions may be cut off so that no great loss is incurred, but in the small packages this is not true. It may be said, in this connection, however, that the majority of consumers view the presence of rind or mold on any food product with considerable suspicion.

In view of the foregoing, the objects contemplated or sought to be obtained by the present invention may be briefly and generally stated as follows: to provide a practical small package of wrapped cheese; to provide a practical small package of wrapped cheese that permits of no contamination through handling from the factory to the consumer; to provide a small package of cheese from which air is entirely precluded whereby consequent growth of mold on the surface of the packaged product is prevented from the time it leaves the factory until it is unwrapped by the consumer; to provide a small package of cheese from which air is entirely precluded whereby all loss by evaporation with consequent drying of the surface of the cheese, as well as all loss in the formation on the cheese of unedible rind is prevented from the time it leaves the hoops in the factory until it is unwrapped by the consumer.

In the accompanying drawings,—

Figures 1 to 3 represent diagrammatically the steps of the preferred method of packaging cheese in accordance with the present invention;

Fig. 4 is a diagrammatical illustration of a modification of the apparatus with which the invention may be practiced; and Fig. 5 is a similar view of a further modification of such apparatus.

In practice the cheese is manufactured as customarily and is placed in forms of any convenient size. After the cheese is placed in the form, usually under pressure, and at any time after it leaves the hoop or form until it has ripened, but preferably before it has formed a rind, it is cut or remolded into comparatively small pieces of the desired size and shape to suit the trade. These small sub-divisions are preferably elongated and angular in cross section although they might probably be circular or cylindrical in cross section. As to size, they usually weigh from one-fourth to one-half pound as it is these smaller quantities which present the greatest difficulties in packaging and in which the greater losses are sustained. These sub-divisions of the cheese and a heated sheet of wrapping material are brought into progressive contact with each other by passing them over or against the surface of a heated member to cement the cheese to the wrapper. Preferably, this heated member is rounded or formed with an edge against which the cheese with its wrapper is passed, the heated member making substantially a line contact with the wrapping material. The heat from said member is transferred to the wrapping material and cheese and by passing successive portions of the cheese and the sheet of heated wrapping or covering over the rounded or annular surface as the cheese is being wrapped, as distinguished from applying the heat after the wrapping is completed, the air is forced from between the cheese and wrapper ahead of the point of contact, thereby entirely precluding all possibility of any air being pocketed under the wrapping material. The heating of the foil and the surface of the cheese results in a bonding of said wrapper to the cheese, so that it is true that the wrapping is also effected in suchwise as to prohibit air subsequently gaining access to the cheese. As a consequence growth of mold or the formation of rind on the cheese is not only prevented but loss by evaporation is also prevented. For a protective covering or wrapping material, parchment paper, a fine-meshed cloth, or a metal foil, may be used, although aluminum foil is a most desirable covering as it has a comparatively high melting point and does not tarnish or discolor the surface of the cheese with which it comes in contact.

The following is an example of proven practice: The cheese is cut from the molded forms into pieces of desired shape and in sizes from one-fourth to one-half pound according to trade conditions. The larger mold of cheese, of course, could be melted and placed in smaller molds of suitable size and shape, instead of cutting, as before mentioned. To heat the covering or wrapping material immediately before and at the time it comes into contact with the cheese there is provided a heated surface against which the covering contacts. This heated surface may consist of a smooth three-fourths inch iron or steel bar indicated at 10 in Figs. 1 to 3, said bar being semi-circular in cross section and resting on a heating surface such as an electric plate 11. When the half round iron 10 is used the balance of the heating surface on which it rests can be covered with asbestos sheets 12, about one-eighth inch of the iron projecting beyond the surface of the asbestos sheets. In carrying out the present process a small strip of the aluminum foil 13 is held firmly at its ends by the operator against one end of the cheese and the foil at the end of the cheese drawn manually with little pressure across the heated bar, the movement of the cheese and foil being slow enough to insure the fusing of the casein with the foil, but fast enough to prevent the melting of undue quantities of the cheese. The extent to which the cheese is melted during this operation is indicated by the melted cheese running ahead of the line of contact between the foil and cheese or from the sides of the cheese as it is being held against the heated member. In lieu of the semi-circular bar 10 there may be used a steam heated pipe 10$^a$ as indicated in Fig. 4 or a smooth metallic bar, annular in cross section, but preferably triangular, as indicated at 10$^b$ in Fig. 5 may be used.

After both ends of the cheese have been covered in this fashion, the excess foil at the edge is removed or cut away to the exact cross sectional dimension of the cheese. A piece of foil, a little wider than the lengthwise dimension of the cheese and a little longer than the sum of the remaining uncovered surfaces of the cheese, is then wrapped around those uncovered portions, in the same manner as the ends of the cheese were covered, that is, portions of the foil and cheese are successively brought into contact with each other with heat applied to them at the points of contact by passing them against the heated member 10. This last or third sheet of foil might be wiped, so to speak, in one direction successively around the piece of cheese, but it is preferable that this larger piece of foil be wiped first toward one end transversely of the cheese and then wiped in the reverse direction around the remaining uncovered portions until the foil has completely encircled the cheese and its two meeting edges overlap. The excess foil at the ends of the package is then turned down over the pieces which have previously been applied to the ends.

Aside from the fact that air is expelled from between the cheese and foil by bringing successive portions of the foil and cheese into contact with each other and aside from the further fact that the application of heat to the line of contact between the foil and cheese results in the foil being cemented to the cheese so as to prevent the re-entry of air, the present process possesses the advantage of producing a wrapped package of cheese wherein there are no folds of any one sheet of foil upon itself at points where the foil contacts with the cheese. The only point, especially in a package which is rectangular in cross-section, at which there will be a double thickness of the foil is at the ends where the last piece of foil to be applied is turned down over the ends. There are not, however, any folds of a sheet upon itself, or, in other words, each sheet, where it contacts with the surface of the cheese, is perfectly flat. This not only insures a thorough cementing of the foil to the cheese over its entire surface, but by eliminating reverse bends in the several sheets of foil, there are no crevices where foreign substances may become lodged.

As has been before mentioned, the cheese is melted on its surface at the time it is brought into contact with its wrapper. This melted cheese which is flowed along the surface of the piece being wrapped in advance of the heating member, thoroughly fills and closes all holes, cracks and the like in the cheese being wrapped. This, also, lends to the results obtained by the present invention.

What I claim is:

1. A method of packaging cheese which consists in progressively bringing a piece of cheese and its protective covering or wrapper together in the presence of heat, said wrapper being pressed against successive portions of the surface of the cheese whereby all air is expelled from between the wrapper and cheese as the heated wrapper is pressed on the cheese.

2. A method of packaging cheese which consists in progressively bringing successive portions of a protective covering or wrapper into contact with the surface of the cheese, and applying pressure and heat to said wrapper and cheese at the successively contacting portions thereof whereby air is expelled from between the wrapper and cheese and said wrapper and cheese cemented together.

3. A method of packaging cheese which consists in progressively pressing a protective covering or wrapper in unfolded condition on the surfaces of the cheese in the presence of heat.

4. A method of wrapping cheese which consists in progressively passing a protective covering or wrapper in unfolded condition on the surfaces of the cheese.

5. A method of packaging cheese which consists in progressively placing a protective covering on the surface of the cheese in unfolded condition, expelling air from between the wrapper and cheese as portions of said wrapper are successively brought into contact with the cheese, and cementing said wrapper to the cheese.

6. A method of wrapping cheese which consists in progressively applying a separate sheet of covering material to each end of the cheese and then progressively applying a third sheet to the remaining surfaces of said cheese.

7. A method of packaging cheese which consists in progressively applying a separate piece of wrapping material to each end of a piece of cheese and a third piece of wrapping to the remaining surfaces of the cheese, and applying heat to successive portions of said wrappings as they are brought into contact with the cheese, whereby each piece is cemented to the cheese.

8. A method of packaging cheese which consists in progressively applying a separate piece of wrapping material to each end of a piece of cheese and a third piece of wrapping to the remaining surfaces of the cheese and applying heat to successive portions of said wrappings as they are brought into contact with the cheese, whereby each piece is cemented to the cheese, and finally turning the edge portions of the third piece of wrapping material over the pieces applied to the ends of the cheese.

9. A package of cheese having each end covered by a separate piece of wrapping material conforming in size and shape to the cross section of the cheese, and the remaining surfaces of the cheese covered by a third piece of said material.

10. A package of cheese having each end covered by a separate piece of wrapping material, conforming in size and shape to the cross section of the cheese, and the remaining surfaces of the cheese covered by a third piece of said material, the edge portions of said third piece being turned down over the pieces at the ends of the cheese.

11. A package of cheese having each end covered by a separate piece of wrapping material, and the remaining surfaces of the cheese covered by a third piece of said material, each piece of wrapping material in contact with the cheese being free of folds upon itself and the end pieces being free of bends.

12. A package of cheese having each end covered by a separate piece of wrapping material, and the remaining surfaces of the cheese covered by a third piece of said material, the edge portions of said third piece being turned over on the pieces at the end of the cheese and each piece of said wrapping material in contact with the cheese being free from folds upon itself.

13. A wrapped package of cheese having its ends entirely covered by separate pieces of wrapping material and a third piece of wrapping material applied directly to the remaining surfaces of the cheese.

14. A wrapped package of cheese having its ends covered by separate pieces of wrapping material bonded thereto and a third piece of material bonded to the remaining surfaces of the cheese.

15. A wrapped package of cheese having its ends entirely covered by separate pieces of wrapping material and a third piece of wrapping material applied directly to the remaining surfaces of the cheese, the contacting portions of said cheese and wrapping material being free of air pockets.

16. A method of packaging cheese which consists in progressively bringing a piece of cheese and its protective covering or wrapper together in the presence of heat and flowing melted cheese along the surface of said cheese in advance of the advancing line of contact between the wrapper and piece of cheese.

17. A method of packaging cheese which consists in progressively bringing successive portions of a protective covering or wrapper in contact with a piece of cheese and applying heat to the advancing line of contact between said wrapper and cheese to melt the latter and fill cracks and the like in the surface thereof at the time the wrapper is brought into contact therewith.

CHARLES F. DOANE.